(12) United States Patent
Scherzinger et al.

(10) Patent No.: US 6,998,056 B2
(45) Date of Patent: Feb. 14, 2006

(54) PROCESS AND DEVICE FOR AERATING A LIQUID WITH GAS

(75) Inventors: Bernhard Scherzinger, Graz (AT); Helmuth Gabl, Graz (AT)

(73) Assignee: Andritz AG, Graz (AT)

( * ) Notice: Subject to any disclaimer, the term of this patent is extended or adjusted under 35 U.S.C. 154(b) by 260 days.

(21) Appl. No.: 10/244,872

(22) Filed: Sep. 17, 2002

(65) Prior Publication Data

US 2003/0071372 A1    Apr. 17, 2003

(30) Foreign Application Priority Data

Sep. 17, 2001    (AT) ............................. A 1458/2001

(51) Int. Cl.
*B01F 3/04*      (2006.01)
*C02F 1/24*      (2006.01)

(52) U.S. Cl. .................. 210/703; 210/221.2; 261/36.1; 261/76; 261/DIG. 75

(58) Field of Classification Search ............... 261/36.1, 261/76, DIG. 75; 210/221.1, 221.2, 703
See application file for complete search history.

(56) References Cited

U.S. PATENT DOCUMENTS

| | | | | |
|---|---|---|---|---|
| 2,128,311 A | * | 8/1938 | Mertes ........................ 423/104 |
| 3,175,687 A | * | 3/1965 | Jones ......................... 210/120 |
| 4,100,071 A | * | 7/1978 | Beurer et al. ................ 210/197 |
| 4,192,856 A | * | 3/1980 | Rapp et al. .................. 423/387 |
| 4,234,560 A | * | 11/1980 | Kuerten et al. ............. 423/659 |
| 4,255,262 A | * | 3/1981 | O'Cheskey et al. ..... 210/221.2 |
| 4,274,959 A | * | 6/1981 | Roediger ................. 210/221.2 |
| 4,482,696 A | * | 11/1984 | Schuster et al. ............. 528/212 |
| 5,154,898 A | * | 10/1992 | Ajinkya et al. ............. 422/227 |
| 5,951,921 A | * | 9/1999 | Koganezawa et al. ..... 261/36.1 |

FOREIGN PATENT DOCUMENTS

| | | | |
|---|---|---|---|
| DE | 4402566 | * | 8/1995 |
| GB | 1549523 | * | 8/1979 |
| GB | 2356860 | * | 6/2001 |

\* cited by examiner

*Primary Examiner*—Thomas M. Lithgow
(74) *Attorney, Agent, or Firm*—Alix, Yale & Ristas, LLP

(57) ABSTRACT

Apparatus and process for aerating a liquid with gas, the apparatus comprising a pressure vessel including a lower section containing the liquid and an upper section containing a volume of the gas. A pressure connection in the upper section of the pressure vessel adapted receives the gas. A nozzle in the upper section of the pressure vessel receives the liquid. An injector extends from the upper section of the pressure vessel to the lower section of the pressure vessel and has a head in fluid communication with the nozzle. Part of the gas volume is sucked in by the vacuum generated by the liquid injected, carried along together with the liquid and mixed intimately with the liquid at the same time.

8 Claims, 3 Drawing Sheets

PROCESS AND DEVICE FOR AERATING A LIQUID WITH GAS

BACKGROUND OF THE INVENTION

The invention relates to a process for aerating a liquid with gas, particularly for use in processes for separating impurities from suspensions by means of flotation, covering the injection of liquid through a nozzle into a volume of gas, as well as a device for aerating a liquid with gas, particularly for use in plants or equipment for separating impurities from a suspension by flotation, covering a pressure vessel for the liquid and a gas volume above it, with a pressure connection for the gas in the upper section of the pressure vessel and a nozzle through which to inject the liquid into it.

Flotation is a physical-mechanical process for removing impurities from suspensions. This process requires gas bubbles to be generated in suitable quantities and size distributions. Hydrophobic or waterproofed substances are carried to the surface of the liquid by the gas bubbles adhering to them and can be removed there together with the froth. Processes of this kind are known, for example, from DE 41 16 916 C2, and have reached a high technical standard. Self-priming injectors are often used to generate the gas bubbles and mix them into the suspension. Here, the flow of suspension charged with impurities exiting from a nozzle generates a vacuum and sucks in gas, which is mixed with the suspension as a result of the pulse exchange between gas and liquid. A device of this type is described, for example, in DE 34 12 431 A1.

A particular problem in the flotation process is how to make available the liquid saturated with gas and in which the gas bubbles are then to be generated. In EP 789 672 A1, a device is disclosed in which pressurised liquid is sprayed into the top section of a pressure vessel through a nozzle, while this top section is full of pressurised gas. Here, the liquid is only in contact with the gas for a short period so very little gas is introduced to the liquid and too little turbulence is generated. As a result, the liquid must typically be circulated several times or higher saturation pressures are needed, which leads to higher energy consumption and higher energy input being required in the subsequent flotation stage. In addition, gas bubbles may also be discharged in the outflow of saturated liquid, which drastically reduces the efficiency of subsequent flotation.

Further from AT 407 844 a process for aerating dispersions is known with flotation cells with a free surface of the suspension where the froth is separated from the surface with an overflow. Also DE 198 45 536 shows a process where gas is mixed with the liquid. As gas advantageously air, which is to be dissolved in the liquid, is used. Due to the existing high flow velocity only a little portion of the available air can be dissolved in fact. Further the air is not sucked in from a volume under pressure, so that in addition the solubility of the gas/air is only little. The DE 40 29 982 shows a couple of variations of nozzles where special devices, as perforated tubes are used for better distribution ob the air in the suspension. By such a construction an additional pressure drop on the gas side is created leading to a highly reduced solubility in the liquid. The suction of the gas/air by the liquid is also strongly affected by this special distribution device. If the liquid is a fiber suspension blocking of the bores may arise in addition.

SUMMARY OF THE INVENTION

The aims of the present invention were thus to find a process and a device to saturate a liquid with a gas with much improved mass transfer, while drawing closer more effectively to the maximum degree of saturation obtainable.

In order to achieve this aim, the invention provides for a process in which part of the gas volume is sucked in by the vacuum generated by the liquid injected, carried along together with the liquid and mixed intimately with the liquid at the same time. In order to achieve the maximum mass transfer, the liquid phase with a large surface area for mass transfer is thus conducted with as much turbulence as possible.

The gas can be sucked easily into the liquid if the liquid is discharged from the nozzle according to the open jet principle.

High turbulence generated by a large quantity of air being circulated is provided if, according to a further feature of the invention, the process is conducted at air charges of 80 to 170%, preferably over 100%.

It is an advantage if the gas bubbles exiting after mixing are recirculated to the gas volume.

To fulfil the objective described above, the device is characterized according to the invention by the nozzle connecting with the head of an injector mounted inside the pressure vessel, where the injector protrudes into the lower section of the pressure vessel holding the liquid, and the head of the injector is connected to the top section of the pressure vessel, which contains the gas volume.

The speed and turbulence in the mixing zone can be increased further if the cross-section area of an end section of the injector head decreases in the direction of the stream.

According to an advantageous configuration, the invention also provides for a mixing pipe with a largely constant cross-section being mounted immediately adjoining the head of the injector.

According to a further configuration, a diffuser with a cross-sectional area that increases in the direction of the stream can adjoin the injector head or the mixing pipe.

In an advantageous configuration, a draft tube for the liquid saturated with gas adjoins the diffuser, and at least this draft tube is immersed in the liquid.

Here, the liquid flow discharged from the propulsion jet nozzle according to the open jet principle generates a vacuum that is used to suck in the air in the head of the pressurised saturation tank (3 to 10 bar). In the mixing pipe, the air and liquid are mixed intimately and the subsequent diffuser is used for energy recovery. Finally, the bubble dispersion is introduced at the base of the cylindrical saturation tank, thus the entire liquid level is used for mass transfer. The gas bubbles rising up collect in the upper section (head) of the saturation tank, where the air is sucked in again, thus causing the gas to circulate.

In order to even out the energy in the liquid stream after mixing of gas and liquid, a radial diffuser submerged in the liquid can be mounted behind the diffuser or the draft tube.

Separation of non-dissolved gas bubbles is made possible according to the invention by a largely cylindrical orifice plate, at least surrounding the bottom of the diffuser, draft tube or radial diffuser sectors submerged in the liquid, and where the orifice plate starts at the base of the pressure vessel.

In an advantageous configuration, the exit point for the liquid saturated with gas leaving the pressure vessel is located below the top edge of the orifice plate.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
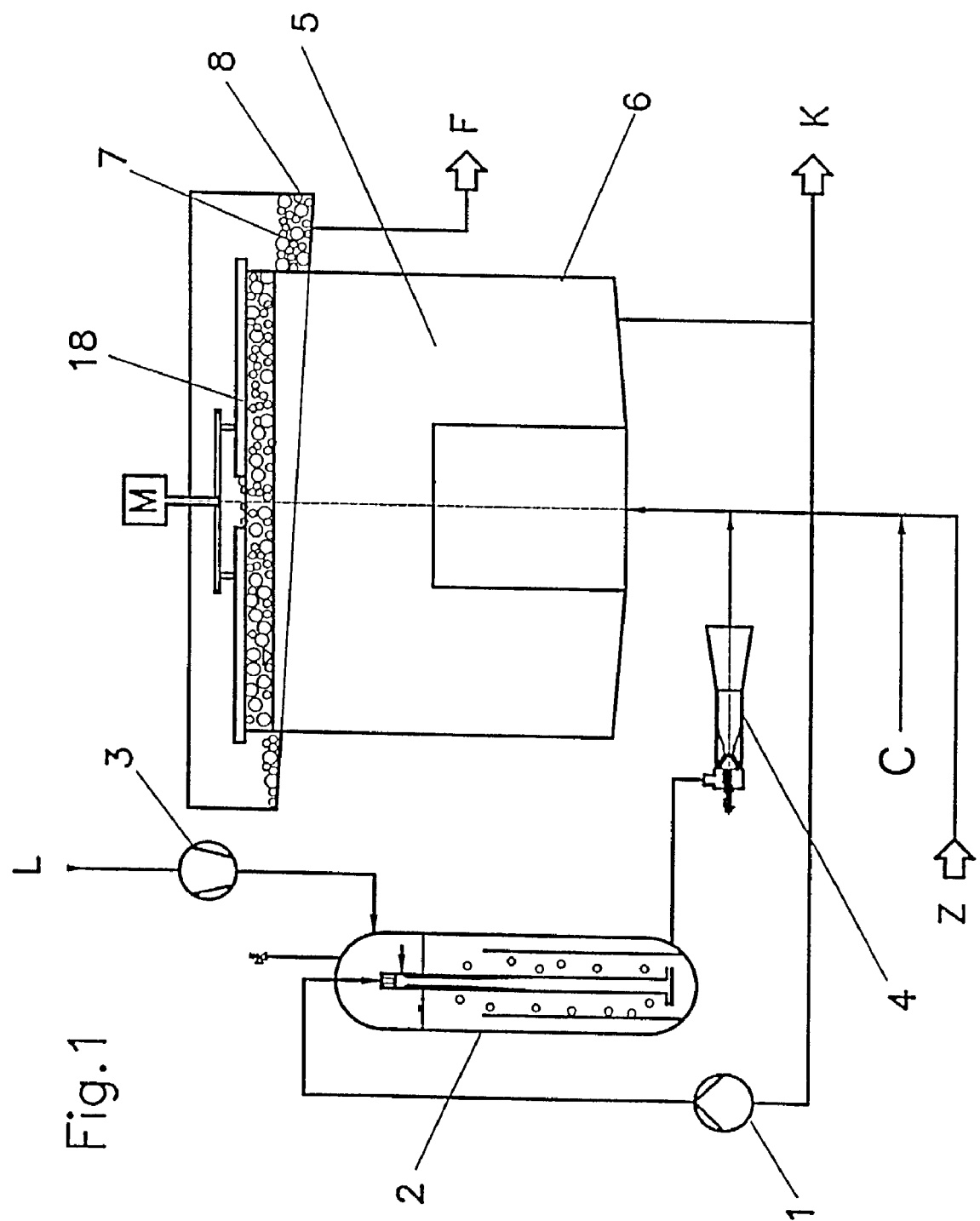
FIG. 1 is a diagrammatic view of a flotation plant according to the invention.

FIG. 1 provides a diagrammatic view of a flotation plant with a device 4 for aerating the liquid with gas. The flotation cell 6 is largely filled with a suspension 5 on whose surface froth 7 forms containing as much as possible of the solids particles to be removed by flotation. A skimmer 18 brings this froth to the froth channel 8, where it drains off as flotate F.

Part of the clarified water K, in the form of a recycling stream, is increased to the desired saturation pressure between 3 and 10 bar using the booster pump 1 and fed to the saturation tank 2 according to the invention. Air L from the surrounding area is compressed to the required saturation pressure by a compressor 3, after which it is also fed to the saturation tank 2, which is specially designed to increase the degree of saturation, and dissolved in the liquid by means of intensive mass transfer. The hydraulic fluid at a pressure increased to saturation point then enters an expansion fitting 4 for pressure reduction and is fed, together with the inflow Z containing solids and possibly with flotation agents C added, to the flotation cell 6, where the flotation process takes place. The very fine gas bubbles that have formed as a result of pressure expansion adhere to hydrophobic solids and carry them to the surface. The suspension that has been cleaned by flotation leaves the flotation cell as clarified water K.

Figure 2:
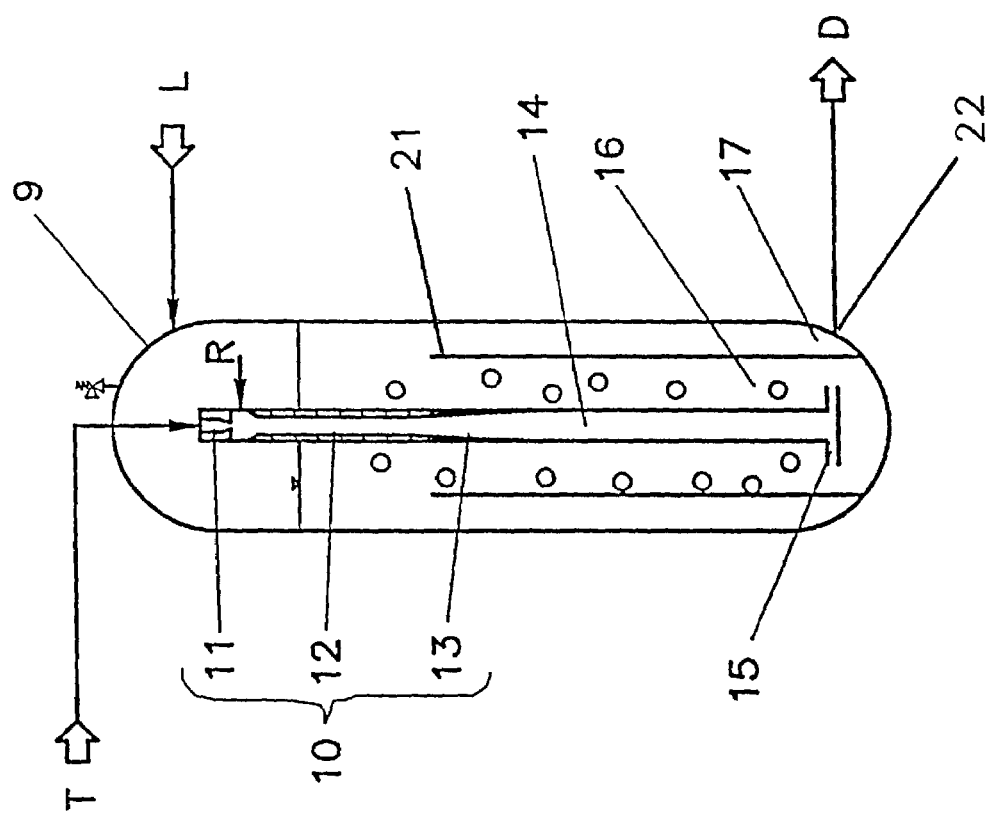
FIG. 2 is a diagrammatic view of a first device for aerating a liquid according to the invention.

FIG. 2 shows the device according to the invention for increasing the degree of saturation with air. The pressure vessel 9 is largely filled with liquid, where the air L required for increasing the degree of saturation is increased to the required saturation pressure using a compressor and enters the air chamber at the head of the pressure vessel. The pressure vessel contains a self-priming injector 10, designed for extreme suction conditions because the air is dissolved in water according to Henry's law and functions most effectively in a bubble system due to the poor dissolving properties of air in water. In the present device, the air is mixed into the liquid phase in the form of micro-bubbles by the self-priming injector 10 designed for extreme suction conditions (80 to 170%). Operation of the injector 10 at high air charges (80 to 170%) of preferably >100% means that more gas is sucked in than liquid introduced. Due to the large amount of circulated air this produces, there is extreme turbulence in the liquid phase, as well as a large mass transfer area, which leads to a greatly improved degree of saturation in comparison with existing systems. The process permits high degrees of saturation with air, even at low pressures, thus it allows energy savings or reduces the liquid retention time in the saturation tank, i.e. smaller apparatus can be built.

Subsequently the gas/liquid dispersion is carried through a pipe 14 to the base of the pressure vessel, where a radial diffuser 15 distributes it over the cross-section of the cylindrical inner chamber 16 formed by cylindrical orifice plate 21. The gas bubbles thus generated rise up through the surrounding liquid to its surface, during which the air collects at the head of the pressure vessel in order to be recirculated. Thus, only the dissolved air has to be increased to saturation pressure in the compressor and added again. The pressurised liquid D brought up to saturation point leaves the pressure vessel at outlet 22 to remove any remaining gas bubbles at the base of the outer chamber 17. Since the bubble dispersion is introduced at the base of a cylindrical inner chamber, it is possible in addition to remove non-dissolved air bubbles from the saturated liquid. As a result, the subsequent flotation stage can run at an optimum.

Figure 3:
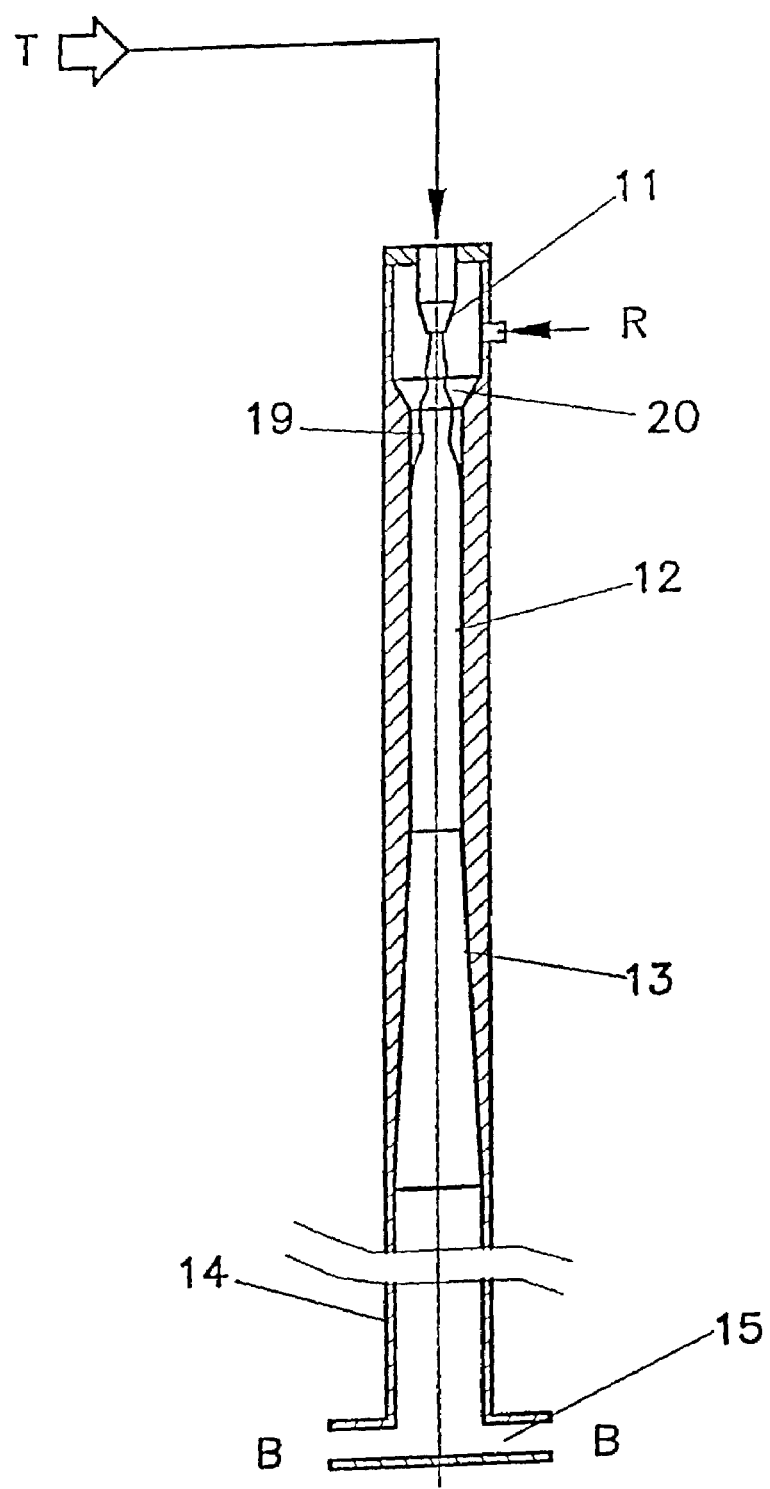
FIG. 3 is a diagrammatic view of a second device for aerating a liquid according to the invention.

FIG. 3 provides a diagrammatic view of a self-priming injector 10. It mainly comprises a propulsion jet nozzle 11, mixing or pulse exchange pipe 12, and diffuser 13. The propulsion liquid T increased to operating pressure is accelerated in the propulsion jet nozzle 11. The liquid stream 19 exiting from the propulsion jet nozzle 11 generates a vacuum by spreading according to the open jet principle, and this vacuum is used to suck in the air R. In the mixing pipe 12, the air is mixed with the propulsion jet liquid, during which fine gas bubbles are generated and there is already intensive mass transfer at high turbulence. The mixing pipe 12 has a largely constant cross-sectional area. The speed and turbulence in the mixing zone can be increased further if the cross-section area of an end section of the injector head 20 decreases in the direction of the stream. The diffuser 13 has a cross-sectional area that increases in the direction of the stream and is used for energy recovery. The gas-liquid dispersion is transported in a pipe 14 as far as the radial diffuser 15, which distributes the bubble dispersion B discharged.

What is claimed is:

1. An apparatus for aerating a liquid with an air, the apparatus comprising:
   a pressure vessel including a lower section adapted for containing the liquid and an upper section adapted for containing a volume of the air;
   a pressure connection disposed in the upper section of the pressure vessel adapted for receiving the air;
   a nozzle disposed in the upper section of the pressure vessel adapted for receiving the liquid;
   an injector extending from the upper section of the pressure vessel to the lower section of the pressure vessel, the injector including
   a head in fluid communication with the nozzle,
   a mixing pipe extending downward from the injector head, the mixing pipe having a substantially constant cross-sectional area,
   a diffuser extending downward from the mixing pipe,
   a draft tube extending downward from the diffuser, and
   a radial diffuser disposed at a lower end of the mixing pipe; and
   a substantially cylindrical orifice plate extending upward from a base of the pressure vessel to a top edge, the orifice plate surrounding at least the radial diffuser, the draft tube and a lower portion of the diffuser.

2. The apparatus of claim 1 wherein an end section of the injector head has a cross-sectional area which decreases in the flow direction.

3. The apparatus of claim 1 wherein the diffuser has a cross-sectional area that increases in the flow direction.

4. The apparatus of claim 3 wherein the draft tube is immersed in the liquid.

5. The apparatus of claim 4 wherein the radial diffuser is disposed below the draft tube, and submerged in the liquid.

6. The apparatus of claim 5 further comprising an outlet for the liquid saturated with air, the outlet being disposed below the top edge of the orifice plate.

7. The apparatus of claim 3 wherein the radial diffuser is disposed below the diffuser, and submerged in the liquid.

8. An apparatus for aerating a liquid with an air, the apparatus comprising:
- a pressure vessel including a lower section adapted for containing the liquid and an upper section adapted for containing a volume of the air;
- a pressure connection disposed in the upper section of the pressure vessel adapted for receiving the air;
- a nozzle disposed in the upper section of the pressure vessel adapted for receiving the liquid;
- an injector extending from the upper section of the pressure vessel to the lower section of the pressure vessel, the injector including
  - a head in fluid communication with the nozzle,
  - a diffuser extending downward from the injector,
  - a draft tube extending downward from the diffuser, and
  - a radial diffuser disposed at a lower end of the draft tube; and
- a substantially cylindrical orifice plate extending upward from a base of the pressure vessel to a top edge, the orifice plate surrounding at least the radial diffuser, the draft tube and a lower portion of the diffuser.

* * * * *